(12) United States Patent
Kinoshita et al.

(10) Patent No.: US 7,153,928 B2
(45) Date of Patent: Dec. 26, 2006

(54) METHOD FOR PRODUCING POLYHYDROXYALKANOATE CRYSTAL

(75) Inventors: Koichi Kinoshita, Kakogawa (JP); Fumio Osakada, Okayama (JP); Yasuyoshi Ueda, Himeji (JP); Karunakaran Narasimhan, West Chester, OH (US); Angella Christine Cearley, Hamilton, OH (US); Kenneth Yee, Cincinnati, OH (US); Isao Noda, Fairfield, OH (US)

(73) Assignees: Kaneka Corporation, Osaka (JP); The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/992,132

(22) Filed: Nov. 19, 2004

(65) Prior Publication Data

US 2005/0222373 A1    Oct. 6, 2005

Related U.S. Application Data

(60) Provisional application No. 60/524,623, filed on Nov. 25, 2003.

(30) Foreign Application Priority Data

Nov. 21, 2003  (JP)  ............................. 2003-392466
Aug. 31, 2004  (JP)  ............................. 2004-252554

(51) Int. Cl.
*C08F 6/00*  (2006.01)

(52) U.S. Cl. .................. 528/480; 528/191; 528/495; 528/499

(58) Field of Classification Search ............... 528/191, 528/480, 495, 499; 435/135
See application file for complete search history.

(56) References Cited

U.S. PATENT DOCUMENTS

| | | | |
|---|---|---|---|
| 4,562,245 A | 12/1985 | Stageman |
| 4,968,611 A | 11/1990 | Traussnig et al. |
| 5,894,062 A | 4/1999 | Liddell |
| 5,942,597 A | 8/1999 | Noda et al. |

FOREIGN PATENT DOCUMENTS

| | | |
|---|---|---|
| EP | 0 707 024 A2 | 4/1996 |
| JP | 59-205992 | 12/1985 |
| JP | 2-69187 | 11/1990 |
| JP | 10-504460 | 4/1999 |
| WO | WO 97/07229 | 2/1997 |

*Primary Examiner*—Terressa Boykin
(74) *Attorney, Agent, or Firm*—Kenyon & Kenyon LLP

(57) ABSTRACT

The present invention provides a method for easily obtaining a biodegradable polyhydroxyalkanoate by a solvent extraction method. A method for producing a polyhydroxyalkanoate crystal comprises mixing a solution of a polyhydroxyalkanoate in a good solvent with a poor solvent at 50 to 130° C. to precipitate a polyhydroxyalkanoate.

17 Claims, No Drawings

METHOD FOR PRODUCING POLYHYDROXYALKANOATE CRYSTAL

This application claims priority to Japanese Patent Application No. 2003-392466 filed 21 Nov. 2003 and Japanese Application No. 2004-252554 filed 31 Aug. 2004 and this application also claims benefit under 35 USC § 119(e) of U.S. Provisional Application No. 60/524,623 filed 25 Nov. 2003, the contents of which are incorporated herein by reference in their entireties.

TECHNICAL FIELD

The present invention relates to a method for efficiently producing a polyhydroxyalkanoate accumulated in a biomass using a solvent.

BACKGROUND ART

A polyhydroxyalkanoate (hereinafter referred to briefly as "PHA") is a biodegradable and thermoplastic polyester which is synthesized and accumulated as an energy storage substance in cells of a variety of microorganisms. A PHA, which is produced by microorganisms using natural organic acids or oils as carbon sources, is completely biodegraded by a microorganism in soil or water to be taken up in the carbon cycle of the natural world. Therefore, a PHA can be said to be an environment-conscious plastic material which hardly causes adverse effects for ecological system. In these years, a synthetic plastic came into a serious social problem in view of environment pollution, waste disposal and oil resource, thus a PHA has attracted attention as an eco-friendly green plastic and its practical applications are longed for.

When a PHA is produced on a commercial scale, there is a case in which microorganisms innately producing a PHA are used, or a case in which a PHA synthetic gene is recombinated into a microorganism or a plant to obtain a transformant, which is to be used as a host for production. In both cases, since a PHA is accumulated in the biomass, the PHA is to be produced by recovering the PHA-containing biomass, and separating and purifying the PHA from the biomass.

As regarding the separation and purification of a PHA from a biomass, a method which is known as the most convenient comprises extracting a PHA using a PHA-soluble solvent, crystallizing the resultant using a poor solvent, and recovering the PHA as a crystal. For example, there is a method comprising drying a biomass in which a PHA is accumulated, extracting the PHA from the dried biomass using a halogen-containing organic solvent such as chloroform and methylene chloride, and then mixing the extract with a poor solvent such as methanol and hexane to precipitate and recover the PHA (see Japanese Kokai Publication Sho-59-205992). With these solvents, a PHA can be extracted from only a dried biomass, therefore a process for drying the biomass obtained from a culture broth is required. In addition, there is such a problem that a halogen-containing organic solvent in connection with the environmental regulation is used.

Japanese Kokai Publication Hei-02-69187 describes a method for extracting a PHB (a homopolymer of 3-hydroxybutyrate) from a wet biomass by a solvent, but all the solvents used in this publication are specific ones such as propanediol and glycerol formal, and are insufficient for commercial scale application from an economical point of view, etc.

Moreover, Japanese Kohyo Publication Hei-10-504460 discloses an extraction using a water-miscible solvent. In this publication, methanol, ethanol and isopropanol are mentioned, but with these solvents, a PHA cannot be extracted unless the biomass is treated under pressurized condition at 100° C. or higher, which is far exceeding the boiling point. There is also concern that a significant molecular weight decrease may occur in the dissolution at a high temperature of 140° C. applied in Example 1 or 2. Furthermore, Japanese Kohyo Publication Hei-10-504460 describes that a hard and opaque gel is formed by cooling, and then the gel is compressed using a rotation roll. However, the present inventors experienced that when a polymer became a hard and opaque gel, it was no longer possible to brush away the gel from a reaction container, and it became substantially impossible to recover a PHA.

In U.S. Pat. No. 5,942,597, a PHA is recovered mainly from a plant using a solvent. In this patent, the recovery is carried out at a PHA concentration of 1%, and the amount to be used of the solvent becomes huge in such low PHA concentration, thus this method is substantially difficult to be applied on a commercial scale. Moreover, the present inventors also experienced that gelation could not be prevented under the above-mentioned conditions, too.

As described above, when a PHA is extracted and recovered using a solvent, since the gelation in crystallization is severe, the solvent extraction method considered to be substantially convenient cannot be used. Alternatively, in order to prevent gelation, there is only a means to carry out dissolution and crystallization at a low PHA concentration. But in this case, since the recovery of a PHA becomes inefficient, it becomes too costly for commercial application in the actual state. As described above, the gelation of PHA is a serious problem. However, even though it has become one of the major causes for obstructing the practical application of a PHA, an effective solution, which prevents gelation, has still not been found.

Accordingly, the subject of the present invention is to provide a method for preventing a polyhydroxyalkanoate from galation, which is a state substantially incapable of being brushed away, and for obtaining its polymer in a quite easily recoverable state, when the polyhydroxyalkanoate is recovered using a solvent from a biomass containing the polyhydroxyalkanoate.

SUMMARY OF THE INVENTION

The present inventors have eagerly investigated on the above-mentioned subject, and as a result, they found that when a PHA is extracted and recovered from a biomass using a good solvent, or when a PHA crystal is dissolved in the good solvent and is recovered, if the mixing temperature drops to below 50° C. at the time that a solution of the PHA in the good solvent is mixed with a poor solvent to precipitate the PHA, the PHA began to be gel state without having fluidity. Moreover, it was also found that the PHA solidifies and becomes a state which cannot be recovered. Thus, they found that by carrying out mixing of the solution of a PHA in a good solvent with a poor solvent at 50 to 130° C., it became possible for the first time to obtain a PHA crystal having fluidity, capable of being brushed away, and further having a low liquid content, which have conventionally been very difficult to obtain. Thereby, they completed the present invention.

That is, the present invention relates to a method for producing a polyhydroxyalkanoate crystal which comprises mixing a solution of a polyhydroxyalkanoate in a good solvent with a poor solvent at 50 to 130° C. to precipitate a polyhydroxyalkanoate.

DETAILED DESCRIPTION OF THE INVENTION

In the following, the preferred embodiment of the present invention is illustrated to describe the present invention in further detail.

The good solvent used for the present invention represents a solvent dissolving 3% by weight or more of a PHA at its boiling point, but preferably ones having a solubility of 4% by weight or more, more preferably 5% by weight or more, and particularly preferably 6% by weight or more. The good solvent is preferably at least one species selected from the group consisting of monohydric alcohols having 4 to 10 carbon atoms, aromatic hydrocarbons having 6 to 10 carbon atoms, ketones having 3 to 7 carbon atoms, and fatty acid alkyl esters having 4 to 8 carbon atoms.

As the monohydric alcohols having 4 to 10 carbon atoms, preferred are butanol, pentanol, hexanol, heptanol, octanol, nonanol, decanol, and isomers thereof (e.g. n-butanol, isobutanol, 2-methyl-1-butanol, 3-methyl-1-butanol, n-pentanol, 2-pentanol, 3-pentanol, n-hexanol, 1-heptanol, 2-heptanol, 3-heptanol, 1-octanol, 2-octanol, n-nonanol, n-decanol, cyclohexanol, 1-methylcyclohexanol, 2-ethylhexanol, benzyl alcohol, etc).

As the aromatic hydrocarbons having 6 to 10 carbon atoms, preferred are benzene, toluene, xylene, ethyl benzene, cumene, butyl benzene, cymene, and isomers thereof (e.g. 1,2,3-trimethylbenzene, 1,2,4-trimethylbenzene, etc).

As the ketones having 3 to 7 carbon atoms, preferred are acetone, methyl ethyl ketone, pentanon, hexanon, heptanone, and isomers thereof (e.g. methyl isobutyl ketone, methyl n-amyl ketone, 2-hexanone, 3-hexanone, 5-methyl-2-hexanone, etc).

Moreover, as the fatty acid alkyl esters having 4 to 8 carbon atoms, there may be mentioned ethyl acetate, propyl acetate, butyl acetate, pentyl acetate, hexyl acetate, methyl propionate, ethyl propionate, propyl propionate, butyl propionate, pentyl propionate, methyl butyrate, ethyl butyrate, propyl butyrate, butyl butyrate, methyl valerate, ethyl valerate, and isomers thereof (e.g. isobutyl acetate, isoamyl acetate, isobutyl isobutyrate, etc). As the fatty acid alkyl esters having 4 to 8 carbon atoms, preferred are ethyl acetate, propyl acetate, butyl acetate, pentyl acetate, hexyl acetate, and isomers thereof.

As the good solvent, one species or two or more can be used.

Among these solvents, particularly preferred are n-butanol, isobutanol, n-pentanol, 2-pentanol, 3-pentanol, toluene, benzene, methyl ethyl ketone, butyl acetate, butyl propionate, ethyl acetate as the good solvents of the present invention in view of having high solubility. Among these good solvents, aromatic hydrocarbons and ketones, that is toluene, benzene, methyl ethyl ketone, are preferred since they can prevent molecular weight of the PHA decrease in dissolution, but toluene is particularly preferred for its comparatively low cost.

The poor solvent represents a solvent which does not dissolve 0.5% by weight or more of a purified PHA at 15 to 25° C. As the poor solvent, preferred are aliphatic hydrocarbons having 6 to 12 carbon atoms. For example, there may be mentioned hexane, heptane, methylcyclohexane, octane, nonane, decane, dodecane, undecane, and isomers thereof (e.g. n-heptane, 2-methylhexane, 3-methylhexane, n-octane, 2-methylheptane, 3-methylheptane, etc). However, among these poor solvents, heptane and methylcyclohexane are particularly preferred as the poor solvent of the present invention, and n-heptane is particularly preferred as heptane. As the poor solvent, one species or two or more can be used.

In the present invention, it is preferred that the good solvent is toluene and the poor solvent is heptane.

In the preferred embodiment of the present invention, a weight ratio of a PHA to be dissolved in a good solvent is not particularly restricted. However, the good solvent may be added so that a weight ratio of a PHA becomes preferably 1 to 20% by weight relative to the total amount of the PHA and the good solvent. More preferably lower limit is 2% by weight, more preferably upper limit is 15% by weight, still more preferably lower limit is 3% by weight, and still more preferably upper limit is 10% by weight.

When the extraction is carried out from a wet biomass, it is preferable to prepare a biomass to have a final water content ratio of the mixture of the wet biomass and a good solvent in the solvent extraction becomes generally 1 to 10% by weight. It is not preferable if the water content exceeds 10% by weight since the solubility of PHA decreases, or the solvent recovery becomes difficult.

The temperature for a PHA extraction is 50° C. or more, preferably 60° C. or more, and more preferably 70° C. or more. However, the temperature preferably does not exceed 130° C. since the temperature is too high so that decomposition of a PHA is occurred.

Duration for the PHA extraction is not particularly restricted, but generally 10 to 600 minutes, preferably 20 to 300 minutes, and more preferably 60 to 120 minutes in view of obtaining preferable extraction efficiency and preventing the decomposition of the PHA.

After dissolving a PHA, the solution is preferably separated from an extraction residual. The separation can be carried out by the methods well-known to the person skilled in the art. In this case, it is advantageous to use a heated filter, and the like. The separation may be carried out under a pressurized condition.

According to the preferred embodiment of the present invention, after dissolving a PHA in a good solvent, the solution is preferably kept hot at 50 to 130° C. If the keeping temperature drops to below 50° C., the PHA may begins to be a gel state without having fluidity, solidifies later, and may becomes a state which cannot be recovered. Meanwhile, if the keeping temperature exceeds 130° C., excessive decomposition of the PHA may be occurred.

In the method for producing a PHA crystal of the present invention, the solution of a PHA in a good solvent is mixed with a poor solvent at 50 to 130° C. Preferably lower limit of the above mixing temperature is 60° C., preferably upper limit is 110° C.

Furthermore, according to the preferred embodiment of the present invention, the poor solvent may be added to the solution of the PHA in the good solvent. On the contrary, the solution of the PHA in the good solvent may be added to the poor solvent. Furthermore, the solution of the PHA in the good solvent and the poor solvent are added simultaneously. However, from the aspect of quality of the obtained PHA crystal, the method is preferred which comprises adding the poor solvent to the solution of the PHA in the good solvent. For instance, the solution of the PHA in the good solvent kept hot at 50° C. or more is mixed with gradually adding the poor solvent, and continue to mix to precipitate the PHA crystal.

According to the preferred embodiment of the present invention, the crystallization of a PHA is carried out at the above keeping temperature under existences of the good solvent and the poor solvent. After that, if necessary, by cooling to below 50° C., the amount of precipitation can be increased. In addition, the present invention can be carried out under a condition of pressure or reduced pressure.

In the present invention, furthermore, to cite a case that a PHA is PHBH (a copolymer composed of 3-hydroxybutyrate and 3-hydroxyhexanoate), it is found that to change the mixing temperature of the solution of the PHA in the good solvent with the poor solvent is important depending on the ratio of 3-hydroxyhexanoate (hereinafter refferd to briefly as "3HH") unit to obtain a PHA having fluidity, capable of being brushed away, and good user-friendliness. When the ratio of 3HH unit is less than 13 mol %, preferred mixing temperature is 85 to 130° C. On the contrary, when the ratio of 3HH unit is not less than 13 mol %, preferred mixing temperature is 50 to 84° C. If the ratio of 3HH unit is less than 13 mol % and the mixing temperature to be less than 85° C., obtained PHA may be gelation. Besides, if the ratio of 3HH unit is not less than 13 mol % and the mixing temperature exceeds 84° C., obtained PHA may be crystal having high adhesion. As mentioned above, an optimum mixing temperature of the solution of the PHBH in the good solvent with the poor solvent depends on the ratio of 3HH unit.

The amount of a poor solvent is preferably such that the weight ratio of the poor solvent relative to the total amount of the poor solvent and a good solvent is 10 to 90% by weight. More preferable lower limit is 20% by weight, still more preferable lower limit is 30% by weight. Besides, more preferable upper limit is 80% by weight, still more preferable upper limit is 70% by weight. By this procedure, it becomes possible to obtain a PHA having fluidity, capable of being brushed away, and further having a low liquid content of the good solvent and the poor solvent, which have conventionally been very difficult to obtain.

The recovery of PHA after the crystallization is carried out by the methods well-known to the person skilled in the art such as a liquid filtration or centrifugation of a PHA solution. The recovered PHA can be washed with the solvent or a mixture thereof selected from the above-mentioned good solvents and poor solvents. But the solvent is not restricted to these, and for example, the PHA can also be washed with solvents such as water, methanol, ethanol, acetone, hexane, or a mixture thereof.

The drying of PHA is carried out by the methods well-known to the person skilled in the art such as, for example, air flush drying and vacuum drying.

The PHA in the present invention is not particularly restricted as for its hydroxyalkanoate components, but specifically, there may be mentioned 3-hydroxybutyrate(3HB), 3-hydroxyvalerate(3HV), 3-hydroxypropionate, 4-hydroxybutyrate, 4-hydroxyvalerate, 5-hydroxyvalerate, 3-hydroxyhexanoate(3HH), 3-hydroxyheptanoate, 3-hydroxyoctanoate, 3-hydroxynonanoate, 3-hydroxydecanoate, etc. The PHA of the present invention may be a homopolymer of one of these hydroxyalkanoates or a copolymer obtainable by copolymerizing two or more species of these. However, preferred is the copolymer obtainable by copolymerizing two or more species of these. As specific examples of the PHA, there may be mentioned PHB (a homopolymer of 3HB), PHBV (a binary copolymer composed of 3HB and 3HV), PHBH (a binary copolymer composed of 3HB and 3HH, see Japanese Patent Publication No. 2777757), PHBHV (a ternary copolymer composed of 3HB, 3HV and 3HH, see Japanese Patent Publication No. 2777757), etc. Particularly among them, a copolymer comprising 3HH as a monomer component is preferable since it has degradability as a biodegradable polymer and softness, and more preferred is PHBH. In this case, the unit ratio of monomer components constituting PHBH is not particularly restricted but ones containing 20 mol % or less of 3HH unit are preferred and ones containing 15 mol % or less of 3HH unit are more preferred and ones containing 10 mol % or less of 3HH unit are particularly preferred in view of preferable crystallinity in the crystallization. In the case of PHBHV, the compositional ratio of monomer units constituting of PHBHV is not particularly restricted, but for example, ones containing 1 to 95 mol % of 3HB unit, 1 to 96 mol % of 3HV unit, and 1 to 30 mol % of 3HH unit are preferred.

To be put into practical use, a PHA should have the weight-average molecular weight determined by a gel chromatography method, in which polystyrene is set as a molecular weight standard, of 10,000 or more. It is preferably 50,000 or more, more preferably 100,000 or more, and particularly preferably 200,000 or more.

The biomass to be used in the present invention is not particularly restricted provided that it is a microorganism capable of accumulating a PHA in cells. For example, microorganisms belonging to the genus *Alcaligenes* such as *Alcaligenes lipolytica* and *Alcaligenes latus*, the genus *Ralstonia* such as *Ralstonia eutropha*, the genus *Pseudomonas*, the genus *Bacillus*, the genus *Azotobacter*, the genus *Nocardia*, the genus *Aeromonas*, the genus *Clostridium*, the genus *Halobacterium*, the genus *Rhodospirillum*, the genus *Zoogloea*, the genus *Candida*, the genus *Yarrowia*, the genus *Saccharomyces* and the like can accumulate a PHA in cells by controlling culture conditions. Alternatively, a transformant obtainable by introducing a gene group involving a PHA synthesis of these microorganisms may also be used. In that case, the host is not particularly restricted, and there may be mentioned microorganisms such as *Escherichia coli* and yeast (see WO 01/88144), and further plants may be mentioned in addition to the above-mentioned microorganisms.

Among these, *Aeromonas caviae* belonging to the genus *Aeromonas* and the transformed cell obtainable by introducing a PHA synthetic group gene derived from said *Aeromonas caviae* are preferable since they have a synthesizing ability of excellent PHBH as a polymer. In particular, more preferred is *Ralstonia eutropha* obtained by introducing a PHA synthetic group gene of *Aeromonas caviae*. One example of said microorganisms is internationally deposited based on Budapest Treaty to the National Institute of Advanced Industrial Science and Technology International Patent Organism Depositary, Central 6, 1-1-1 Higashi, Tsukuba, Ibaraki, Japan under the name of *Alcaligenes eutrophus* AC32 (accession date: Aug. 7, 1997, accession number: FERM BP-6038).

A method for culturing the PHA-producing microorganisms mentioned hereinabove is not particularly restricted, but for example, the method well-known to the person skilled in the art disclosed in Japanese Kokai Publication 2001-340078 can be used.

In recovering a PHA, it is naturally preferable that the PHA content in the cultured microbial cell is higher. In the application for a commercial production, PHA content in dried biomass is preferably 50% by weight or more. Taking subsequent separation operations, purity of a separated polymer and the like into consideration, the PHA content is more preferably 60% by weight or more, and still more preferably 70% by weight or more.

After completion of the culture, the biomass is obtained directly from a cultured broth in the dried state by general methods such as, for example, spray drying, or the biomass is recovered by methods such as centrifugation or membrane separation. The recovered biomass can be used in the extraction process as a dried state, or as a state of wet biomass moistened with water. Furthermore, a wet biomass obtained by washing the recovered biomass with a lipid solvent such as methanol and acetone, or one obtained by drying said biomass can also be used as a PHA-extracting biomass.

The PHA obtained according to the present invention may be formed into various forms, such as fibers, threads, ropes, textiles, fabrics, nonwoven fabrics, papers, films, sheets, tubes, boards, sticks, containers, bags, parts, foamed bodies, etc. Moreover, it may also be processed into a biaxial stretched film. The formed products may be suitably used for such fields as agriculture, fishery, forestry, gardening, medical, sanitary products, clothing, non-clothing, packaging, and others.

The present invention is also a method for producing an extraction residual substance which comprises extracting a PHA from a biomass including a PHA and decreasing its solvent content.

As the method for extraction a PHA from the biomass including the PHA, the method for producing a PHA crystal mentioned above can be used, or another known methods can be used.

The method for decreasing solvent content of the extraction residual substance is not particularly restricted, but for example, drying by heating, vacuum homothermal dry, drum heater, high temperature heating oven, heater using far infrared radiation, etc.

The extraction residual substance after being treated according to the present invention are preferably used as animal feed, microorganism feed, or vegetable fertilizer. Accordingly, the solvent to be used in the present invention is preferably in such an amount that is permissible as feed or fertilizer. However, it is preferable to substantially remove the solvent from the extraction residual substance.

Animal feed, microorganism feed, or vegetable fertilizer comprised the above extraction residual substance is one of the present inventions.

By the method of the present invention, a PHA can be obtained which is having fluidity, capable of being brushed away, and further having a low liquid content while preventing gelation, thus it becomes possible to produce and provide a PHA which has also separation, detergency and has good quality at low cost on a commercial scale.

BEST MODE FOR CARRYING OUT THE INVENTION

Hereinafter, the present invention will be described in further detail by way of examples. In each example, poly (3-hydroxybutyrate-co-3-hydroxyhexanoate) (hereinafter referred to briefly as "PHBH") was produced as a copolyester. Surely, the present invention is not limited to these Examples in its technical scope, and is not restricted to the production of PHBH.

In these Examples, the weight-average molecular weight of a PHBH was determined using Shimadzu's gel chromatography system (RI detection) equipped with Shodex K806L (300×8 mm, 2 columns-connected) (product of Showa Denko K.K.) with chloroform as a mobile phase. As the molecular weight standard sample, commercially available standard polystyrene was used. Moreover, the PHBH purity was determined by gas chromatography after methyl esterification of PHBH. The water content of wet biomass is measured using the infrared water balance FD-230 manufactured by Kett Electric Laboratory.

EXAMPLE 1

PHBH was produced by culturing R. eutropha obtained by introducing a PHA synthetic gene group derived from Aeromonas caviae (deposition number FERM BP-6038) according to the method described in Example 4 (carbon sources: only 5% of palm oil) of Japanese Kokai Publication 2001-340078. After completion of the culture, biomass was recovered by centrifugation to obtain wet biomass, and further the biomass was dried in vacuum at 50° C. for 15 hours to obtain dried biomass. The dried biomass had a PHBH content of 60%, the weight-average molecular weight of 1,300,000, and 3-hydroxyhexanoate (hereinafter referred to briefly as "3HH") unit of 7 mol %. 24.8 g of the dried biomass and 211.4 g of isobutanol were put into a flask, and an extraction was carried out at 100° C. for 1 hour. The solution was transferred into a jacket-type pressurized filter kept hot at 100° C., and a PHBH solution was recovered by filtration. The recovered solution was kept hot at 90° C., and 210 g of heptane was gradually added thereto while vigorously stirring the solution, and then white PHBH was precipitated. The solution was cooled to room temperature. PHBH could be recovered easily by filtration, and the recovered PHBH was washed with 50 g of a mixture solvent comprising isobutanol and heptane in an equivalent amount, and dried in vacuum at 45° C. The recovery amount was 14.1 g (95%), the purity was 99% or more, and the 3HH unit was 7 mol %. Although the molecular weight decreased to 1,010,000, it was sufficient molecular weight for processing.

COMPARATIVE EXAMPLE 1

PHBH was extracted in the same manner as Example 1. the solution was recovered, crystallization was attempted by gradually cooling to 40° C. under vigorous stirring, but PHBH gelated significantly and could not be recovered. Accordingly, it is difficult to recover the PHBH having user-friendliness by the crystallization of only slow cooling.

EXAMPLE 2

Biomass was recovered from the cultured solution used in Example 1 by centrifugation to obtain wet biomass. To 41.3 g of the wet biomass having the water content of 40% (biomass dry weight 24.8 g, the dried biomass had a PHBH content of 60%), 211 g of isobutanol was added and an extraction was carried out at 100° C. for 2 hours. Thereafter, the resultant was transferred into a jacket-type pressurized filter kept hot at 100° C., and a PHBH solution was recovered by filtration. The recovered solution was kept hot at 90° C., and 210 g of heptane was gradually added thereto while vigorously stirring the solution, and then white PHBH was precipitated. The solution was cooled to room temperature. PHBH could be recovered easily by filtration, and washed and dried in the same manner as Example 1. The recovery amount was 13.8 g (93%), the purity was 99% or more, and the 3HH unit was 7 mol %. Although the molecular weight decreased to 880,000, it was sufficient molecular weight for processing.

EXAMPLE 3

24.8 g of the dried biomass obtained in Example 1 and 211.4 g of toluene were put into a flask, and an extraction was carried out at 100° C. for 1 hour. The solution was transferred into a jacket-type pressurized filter kept hot at 100° C., and a PHBH solution was recovered by filtration. The recovered solution was kept hot at 90° C., and 210 g of heptane was gradually added thereto while vigorously stirring the solution, and then white PHBH was precipitated. The solution was cooled to room temperature. PHBH could be recovered easily by filtration, and the recovered PHBH was washed with 50 g of a mixture solvent comprising toluene and heptane in an equivalent amount, and dried in vacuum at 45° C. The recovery amount was 14.3 g (97%), the purity was 99% or more, and the 3HH unit was 7 mol %. The molecular weight was 1,280,000, which was hardly decreased.

EXAMPLE 4

PHBH was extracted in the same manner as Example 2. After the solution was recovered, crystallization was carried out by adding 210 g of heptane at 60° C. under vigorous stirring. However, PHBH became a gel state containing a large amount of solvents and having bad fluidity. PHBH could manage to be recovered, but a PHBH filtration was not very good.

EXAMPLE 5

PHBH was produced by culturing *R. eutropha* obtained by introducing a PHA synthetic gene group derived from *Aeromonas caviae* (deposition number FERM BP-6038) according to the method described in Example 2 (carbon sources: 4% of palm oil +1% of hexanoic acid) of Japanese Kokai Publication 2001-340078. After completion of the culture, biomass was recovered by centrifugation to obtain wet biomass, and further the biomass was dried in vacuum at 50° C. for 15 hours to obtain dried biomass. The dried biomass had a PHBH content of 60%, the weight-average molecular weight of 750,000, and 3HH unit of 10 mol %. 24.8 g of the dried biomass and 211.4 g of toluene were put into a flask, and an extraction was carried out at 100° C. for 1 hour. The solution was transferred into a jacket-type pressurized filter kept hot at 100° C., and a PHBH solution was recovered by filtration. The recovered solution was kept hot at 90° C., and 210 g of heptane was gradually added thereto while vigorously stirring the solution, and then white PHBH was precipitated. The solution was cooled to room temperature. PHBH could be recovered easily by filtration, and the recovered PHBH was washed with 50 g of a mixture solvent comprising toluene and heptane in an equivalent amount, and dried in vacuum at 45° C. The recovery amount was 14.0 g (94%), the purity was 99% or more, and the 3HH unit was 10 mol %. Although the molecular weight decreased to 700,000, it was sufficient molecular weight for processing.

EXAMPLE 6

PHBH was extracted in the same manner as Example 5. After the solution was recovered, crystallization was carried out by adding 210 g of heptane at 70° C. under vigorous stirring. However, PHBH became a gel state and having bad fluidity. PHBH could manage to be recovered, but a PHBH filtration was not very good.

EXAMPLE 7

PHBH was produced by culturing *R. eutropha* obtained by introducing a PHA synthetic gene group derived from *Aeromonas caviae* (deposition number FERM BP-6038) according to the method described in Example 2 (carbon sources: 3% of palm oil +2% of hexanoic acid) of Japanese Kokai Publication 2001-340078. After completion of the culture, biomass was recovered by centrifugation to obtain wet biomass, and further the biomass was dried in vacuum at 50° C. for 15 hours to obtain dried biomass. The dried biomass had a PHBH content of 60%, the weight-average molecular weight of 1,450,000, and 3HH unit of 14 mol %. 24.8 g of the dried biomass and 211.4 g of toluene were put into a flask, and an extraction was carried out at 98° C. for 1 hour. The solution was transferred into a jacket-type pressurized filter kept hot at 98° C., and a PHBH solution was recovered by filtration. The recovered solution was kept hot at 80° C., and 210 g of heptane was gradually added thereto while vigorously stirring the solution, and then white PHBH was precipitated. The solution was cooled to room temperature. PHBH could be recovered easily by filtration, and the recovered PHBH was washed with 50 g of a mixture solvent comprising toluene and heptane in an equivalent amount, and dried in vacuum at 45° C. The recovery amount was 13.9 g (93%), the purity was 99% or more, and the 3HH unit was 14 mol %. The molecular weight was 1,300,000.

EXAMPLE 8

PHBH was extracted in the same manner as Example 7. After the solution was recovered, when heptane was added to the PHBH solution kept hot at 90° C. under vigorous stirring, PHBH crystal having adhesion was finally obtained. Also, colored PHBH was observed.

EXAMPLE 9

PHBH was produced by culturing *R. eutropha* obtained by introducing a PHA synthetic gene group derived from *Aeromonas caviae* (deposition number FERM BP-6038) according to the method described in Example 2 (carbon sources: 3% of palm oil +2% of hexanoic acid) of Japanese Kokai Publication 2001-340078. After completion of the culture, biomass was recovered by centrifugation to obtain wet biomass, and further the biomass was dried in vacuum at 50° C. for 15 hours to obtain dried biomass. The dried biomass had a PHBH content of 60%, the weight-average molecular weight of 1,200,000, and 3HH unit of 15 mol %. 24.8 g of the dried biomass and 211.4 g of toluene were put into a flask, and an extraction was carried out at 98° C. for 1 hour. The solution was transferred into a jacket-type pressurized filter kept hot at 98° C., and a PHBH solution was recovered by filtration. The recovered solution was kept hot at 70° C., and 210 g of heptane was gradually added thereto while vigorously stirring the solution, and then white PHBH was precipitated. The solution was cooled to room temperature. PHBH could be recovered easily by filtration, and the recovered PHBH was washed with 50 g of a mixture solvent comprising toluene and heptane in an equivalent amount, and dried in vacuum at 45° C. The recovery amount was 14.1 g (95%), the purity was 99% or more, and the 3HH unit was 15 mol %. The molecular weight was 1,100,000.

EXAMPLE 10

PHBH was extracted in the same manner as Example 9. After the solution was recovered, when heptane was added to the PHBH solution kept hot at 90° C. under vigorous stirring, PHBH crystal having adhesion was finally obtained. Also, colored PHBH was observed.

COMPARATIVE EXAMPLE 2

PHBH was extracted in the same manner as Example 9. After the solution was recovered, when heptane was added to the PHBH solution kept hot at 90° C. under vigorous stirring, PHBH gelated significantly. A PHBH filtration was extremely bad and PHBH could not be recovered.

COMPARATIVE EXAMPLE 3

24.8 g of the dried biomass obtained Example 1 and 211.4 g of toluene were put into a flask, and an extraction was carried out at 100° C. for 1 hour. The solution was transferred into a jacket-type pressurized filter kept hot at 98° C., and a PHBH solution was recovered by filtration. The recovered solution was put into a pressure tight case and was kept hot at 140° C. under sealing, and 210 g of heptane was gradually added thereto. After completion of the adding, PHBH be turned sever oil was obtained. The said PHBH was gradually cooled to room temperature while vigorously stirring, and further the said PHBH was filtered and was dried to obtain substantially high adhesive PHBH solid. Colored solid was observed, and the purity got worse to 95%.

The invention claimed is:

1. A method for producing a polyhydroxyalkanoate crystal which comprises mixing a solution of a polyhydroxyalkanoate in a good solvent with a poor solvent at 50 to 130° C. to precipitate a polyhydroxyalkanoate,
    wherein the polyhydroxyalkanoate is a copolymer composed of 3-hydroxyhexanoate and 3-hydroxybutyrate,
    a mixing temperature of the solution of the polyhydroxyalkanoate in the good solvent with the poor solvent is 85 to 130° C. when a ratio of the 3-hydroxyhexanoate in the polyhydroxyalkanoate is less than 13 mol %, and
    a mixing temperature of the solution of the polyhydroxyalkanoate in the good solvent with the poor solvent is 50 to 84° C. when a ratio of the 3-hydroxyhexanoate in the polyhydroxyalkanoate is not less than 13 mol %.

2. The method for producing a polyhydroxyalkanoate crystal according to claim 1, which further comprises the step of adding the poor solvent to the solution of the polyhydroxyalkanoate in the good solvent.

3. A method for producing a polyhydroxyalkanoate crystal which comprises mixing a solution of a polyhydroxyalkanoate in a good solvent with a poor solvent at 50 to 130° C. to precipitate a polyhydroxyalkanoate,
    wherein the good solvent of the polyhydroxyalkanoate is at least one species selected from the group consisting of monohydric alcohols having 4 to 10 carbon atoms, aromatic hydrocarbons having 6 to 10 carbon atoms, ketones having 3 to 7 carbon atoms, and fatty acid alkyl esters having 4 to 8 carbon atoms.

4. The method for producing a polyhydroxyalkanoate crystal according to claim 3, wherein the monohydric alcohol having 4 to 10 carbon atoms is at least one species selected from the group consisting of butanol, pentanol, hexanol, heptanol, octanol, nonanol, decanol, and isomers thereof.

5. The method for producing a polyhydroxyalkanoate crystal according to claim 3, wherein the aromatic hydrocarbons having 6 to 10 carbon atoms is at least one species selected from the group consisting of benzene, toluene, xylene, ethyl benzene, cumene, butyl benzene, cymene, and isomers thereof.

6. The method for producing a polyhydroxyalkanoate crystal according to claim 3, wherein the ketones having 3 to 7 carbon atoms is at least one species selected from the group consisting of acetone, methyl ethyl ketone, methyl butyl ketone, pentanon, hexanon, cyclohexanon, heptanone, and isomers thereof.

7. The method for producing a polyhydroxyalkanoate crystal according to claim 3, wherein the fatty acid alkyl esters having 4 to 8 carbon atoms is at least one species selected from the group consisting of ethyl acetate, propyl acetate, butyl acetate, pentyl acetate, hexyl acetate, and isomers thereof.

8. A method for producing a polyhydroxyalkanoate crystal which comprises mixing a solution of a polyhydroxyalkanoate in a good solvent with a poor solvent at 50 to 130° C. to precipitate a polyhydroxyalkanoate,
    wherein the poor solvent is an aliphatic hydrocarbon having 6 to 12 carbon atoms.

9. The method for producing a polyhydroxyalkanoate crystal according to claim 8, wherein the poor solvent is at least one species selected from the group consisting of hexane, heptane, methylcyclohexane, octane, nonane, decane, dodecane, undecane, and isomers thereof.

10. The method for producing a polyhydroxyalkanoate crystal according to claim 1, wherein the weight ratio of the polyhydroxyalkanoate relative to the total amount of the polyhydroxyalkanoate and the good solvent is within the range of 1 to 20% by weight.

11. The method for producing a polyhydroxyalkanoate crystal according to claim 1, wherein the weight ratio of the poor solvent relative to the total amount of the poor solvent and good solvent is 10 to 90% by weight.

12. The method for producing a polyhydroxyalkanoate crystal according to claim 9, wherein the good solvent is toluene and the poor solvent is heptane.

13. A method for producing a polyhydroxyalkanoate crystal which comprises mixing a solution of a polyhydroxyalkanoate in a good solvent with a poor solvent at 50 to 130° C. to precipitate a polyhydroxyalkanoate,
    wherein the polyhydroxyalkanoate is produced by at least one microorganism selected from the group consisting of species belonging to the genus *Aeromonas, Alcaligenes, Azotobacier, Bacillus, Clostridium, Halobacterium, Norcadia, Rhodospirillum, Psuedomonas, Ralstonia, Zoogloea, Candida, Yarrowia*, and *Saccharomyces*.

14. The method for producing a polyhydroxyalkanoate crystal according to claim 13, wherein the polyhydroxyalkanoate is produced by a transformant obtained by introducing a polyhydroxyalkanoate synthetic gene group derived from *Aeromonas caviae*.

15. The method for producing a polyhydroxyalkanoate crystal according to claim 14, wherein the transformant obtained by introducing a polyhydroxyalkanoate synthetic gene group derived from *Aeromonas caviae* is *Ralstonia eutropha* obtained by introducing a polyhydroxyalkanoate synthetic gene group derived from *Aeromonas caviae*.

16. A method for producing an extraction residual substance which comprises
    extracting a polyhydroxyalkanoate from a biomass including a polyhydroxyalkanoate produced by mixing a solution of a polyhydroxyalkanoate in a good solvent with a poor solvent at 50 to 130° C. to precipitate a polyhydroxyalkanoate, and
    decreasing solvent content in the extraction residual substance.

17. Animal feed, microorganism feed, or vegetable fertilizer which comprises an extraction residual substance produced by the method of claim 16.

* * * * *

UNITED STATES PATENT AND TRADEMARK OFFICE
CERTIFICATE OF CORRECTION

PATENT NO. : 7,153,928 B2
APPLICATION NO. : 10/992132
DATED : December 26, 2006
INVENTOR(S) : Kinoshita et al.

It is certified that error appears in the above-identified patent and that said Letters Patent is hereby corrected as shown below:

<u>Column</u>  <u>Line</u>

12  37  Change "*Azotobacier*" to --*Azotobacter*--.

Signed and Sealed this

First Day of May, 2007

JON W. DUDAS
*Director of the United States Patent and Trademark Office*